(12) United States Patent
Liu et al.

(10) Patent No.: US 9,595,275 B1
(45) Date of Patent: Mar. 14, 2017

(54) RESET OF MAGNETIC DOMAINS IN WRITE HEAD VIA MAGNETIC FIELD FROM MEDIA

(71) Applicant: Seagate Technology LLC, Cupertino, CA (US)

(72) Inventors: Yanzhang Liu, Eden Prairie, MN (US); Kirill Rivkin, Edina, MN (US); Lei Lu, Bloomington, MN (US); Huaqing Yin, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/976,184

(22) Filed: Dec. 21, 2015

(51) Int. Cl.
*G11B 5/48* (2006.01)
*G11B 5/82* (2006.01)

(52) U.S. Cl.
CPC ............. *G11B 5/4886* (2013.01); *G11B 5/82* (2013.01)

(58) Field of Classification Search
CPC .... G11B 2005/0021; G11B 2005/0005; G11B 5/4907; G11B 5/2452; G11B 27/36; G11B 5/012; G11B 2220/20; G11B 5/02; G11B 25/043; G11B 33/08; G11B 33/1493; G11B 5/11
USPC ... 360/324.11, 328, 46, 45, 135, 122, 97.11, 360/31, 97.12, 97.21, 66; 369/30.13, 369/30.12
See application file for complete search history.

(56) References Cited

U.S. PATENT DOCUMENTS

| | | | |
|---|---|---|---|
| 5,815,342 A * | 9/1998 | Akiyama | G11B 5/00 360/122 |
| 6,437,949 B1 | 8/2002 | Macken et al. | |
| 7,236,333 B2 | 6/2007 | Macken | |
| 7,986,493 B2 | 7/2011 | Weller et al. | |
| 8,472,147 B2 | 6/2013 | Singleton et al. | |
| 8,564,910 B2 * | 10/2013 | Benakli | G11B 5/115 360/317 |
| 8,891,204 B2 | 11/2014 | Macken et al. | |
| 2006/0061913 A1* | 3/2006 | Sekiguchi | G11B 5/11 360/323 |
| 2010/0118432 A1* | 5/2010 | Shibano | B82Y 10/00 360/64 |
| 2011/0228423 A1* | 9/2011 | Koui | G11B 5/1278 360/75 |
| 2011/0249364 A1 | 10/2011 | Bai et al. | |

* cited by examiner

*Primary Examiner* — Nabil Hindi
(74) *Attorney, Agent, or Firm* — Holzer Patel Drennan (57) ABSTRACT

A method of removing a magnetic domain from a slider structure, such as a shield of a write head, in a storage assembly having a storage media. The method includes passing the slider structure in close proximity to a region on the storage media having a magnetic field sufficiently large to remove a magnetic domain in the slider structure.

19 Claims, 5 Drawing Sheets

RESET OF MAGNETIC DOMAINS IN WRITE HEAD VIA MAGNETIC FIELD FROM MEDIA

BACKGROUND

In a magnetic data storage and retrieval system, a magnetic read/write head typically includes a writer portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc Unfortunately, these data storage devices often experience specific errors and failure modes due to an undesired magnetic flux originating from a location of the read/write head. It is not uncommon for a magnetic domain, or domain wall, to form in shield(s) of the read/write head. This phenomenon can dynamically vary during various operations conducted by the read/write head and result in sporadic and inconsistent reading and/or writing failures.

SUMMARY

Generally, this disclosure is directed to methods to set (reset) a read/write head or read/write transducer magnetization by using an interaction between magnetic media and the magnetic writer.

One particular implementation described herein is a method of removing a magnetic domain from a slider structure in a storage assembly having a storage media. The method comprises passing the slider structure in close proximity to a region on the storage media having a magnetic field sufficiently large to switch a magnetization direction of the magnetic domain and thus remove the magnetic domain from the slider structure.

Another particular implementation is a method of removing a magnetic domain from a shield in a write head. The method comprises passing the write head in close proximity to a region on a storage media having a magnetic field sufficiently large to converge toward the pole tip and mitigate the magnetic domain.

Yet another particular implementation described herein is a magnetic media comprising a plurality of tracks each having a plurality of data bits, and a reset region extending cross-track across at least two tracks and extending down-track at least 1 micrometer, the reset region having a unidirectional magnetization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

As discussed above, memory or data storage assemblies, such as disc drive assemblies, include a slider that has a write head (or write sensor or write transducer or merely writer) and a read head (or read sensor or read transducer or merely reader) that is designed and configured to glide on an air bearing over a magnetic media, such as a magnetic data storage disc. Often, the read head and the write head are called a read/write head. The read/write head includes various shields.

This disclosure is directed to apparatus configurations and methods to set (reset) a magnetization in a read/write head shield via an interaction between a magnetic field present on the magnetic media and the magnetic writer. The devices and methods of this disclosure provide for removal of domain walls in the writer shield(s) (e.g., trailing shield, side shields) during operational use of the writer, that is, when the writer is incorporated into a memory assembly.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
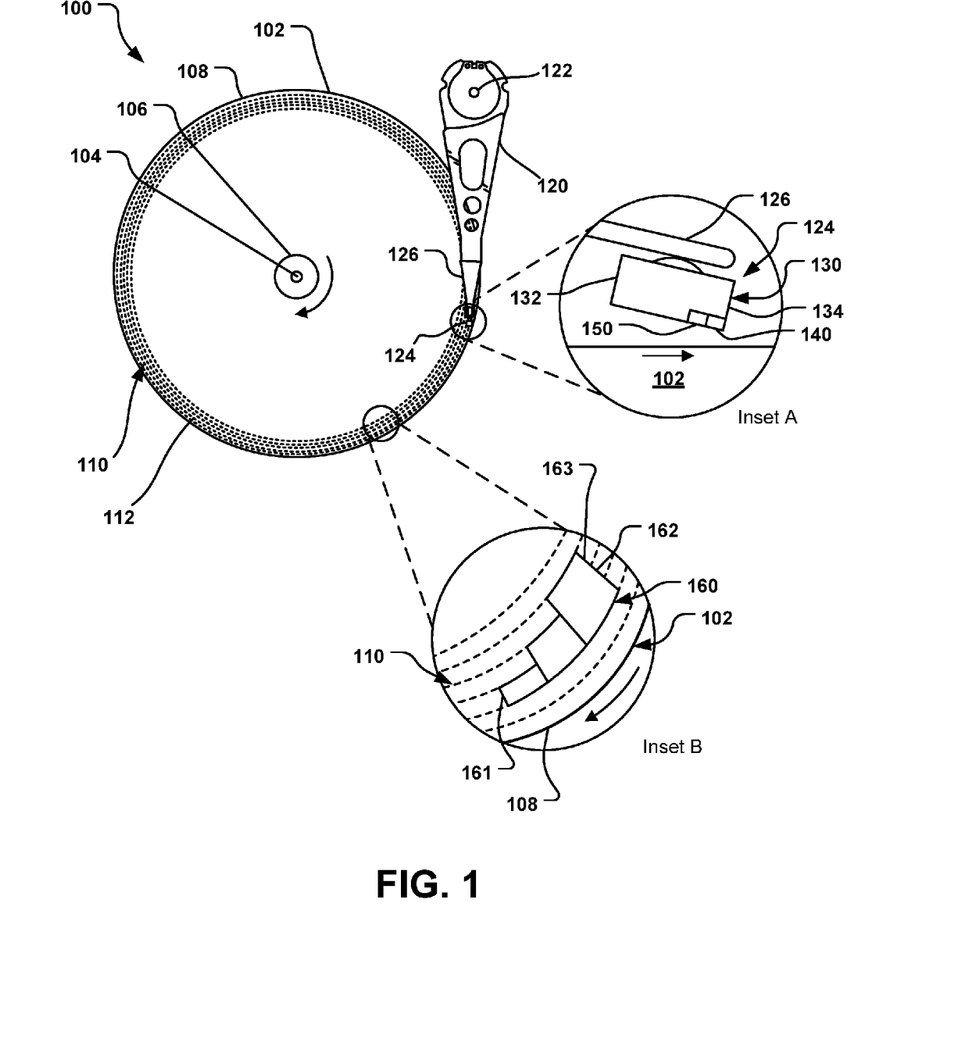
FIG. 1 is a top view of an example recording device with a write head and storage media.

FIG. 1 illustrates a top view of an example data storage assembly 100 using a write sensor disclosed herein. The data storage assembly 100 includes a disc 102, which rotates about a spindle center or a disc axis of rotation 104 during operation. The disc 102 includes an inner diameter 106 and an outer diameter 108 between which are a number of concentric data tracks 110, illustrated by dashed lines. The data tracks 110 are substantially circular and are made up of regularly spaced bits 112, indicated as dots or ovals on the disc 102. A typical data track 110 has a cross-track dimension (width) of about 70-100 nm, and a typical bit 112 occupies the width of the track 110 and has a down-track dimension of about 13-20 nm, thus, an overall area of about 910-2,000 $nm^2$. The track 110 is divided into numerous sectors (not shown) and subsectors (not shown); in some implementations, a track has 200-400 sectors each about 11,000-21,000 nm long (based on a disc of 1 inch radius and operating at an rpm of 1000) and that stores 512 bytes of data. Multiple sectors are arranged, end-to-end, around a track 110 on the disc 102. It should be understood, however, that the described technology may be employed with other types of storage media, including continuous magnetic media, discrete track (DT) media, etc.

Information is written to and read from the bits 112 on the disc 102 in different data tracks 110. An actuator assembly 120 having an actuator axis of rotation 122 supports a transducer head or slider 124 via a head-gimbal-assembly (HGA) 126 at the distal end of the actuator assembly 120. The slider 124 flies in close proximity above the surface of the disc 102 during disc operation. The actuator assembly 120 rotates during a seek operation about the actuator axis of rotation 122 positioned adjacent to the disc 102. The seek operation positions the slider 124 over a target data track of the data tracks 110.

An enlarged view in Inset A illustrates an expanded, schematic and simplified side view of the slider 124 shown supported by the HGA 126 over the disc 102. The slider 124 has a slider body 130 having a leading edge 132 and a trailing edge 134 with a write head 140 and a read head or sensor 150 proximate the trailing edge 134; the surface of the slider 124 facing the disc 102 is an air bearing surface (ABS). The slider 124 is shown "flying" over the disc 102, with a spacing between the ABS and the disc 102, e.g., of 0.5 to 1.5 nm.

Not shown in FIG. 1, the write head 140 on the ABS includes a pole tip that generates the majority of the magnetic field used in writing the information on the disc 102. The write head 140 also has various magnetic shields (also not shown in FIG. 1). During use of the write head 140, magnetic domain walls (DWs) can form in the shields. These DWs can result in a highly non-uniform magnetic flux even in the magnetic media, resulting in sporadic and inconsistent data writing to the disc 102. The present disclosure uses a magnetic stray field originating from the magnetic disc 102 to selectively impact the shield of the write head 140 and read head 150, with the purpose of aligning the magnetization uniformly in the cross-track direction of the shields.

Inset B illustrates an enlarged view of the disc 102 and several data tracks 110. In accordance with this disclosure, present on the disc 102 is a magnetic region 160 that produces a directed magnetic field sufficiently large to modify a magnetic domain in the slider 124, particularly in the shields of write head 140, as well as in the shields of the read head 150 or other large magnetic structures located on the slider 124 close to the magnetic disc 102.

The pattern (shape and magnetization) of the reset region 160 can be optimized for the purpose of improving the probability of removing or modifying the DW in the slider structure. The desired pattern is based on various factors to maximize the effectiveness of the region 160 on the particular design of the write head 140 and/or read head 150 and the type of media (e.g., disc 102). A common feature for the reset region 160 is that by varying the width and length of the magnetized regions of the region 160, as well as the mutual polarity, relatively strong magnetic fields can be created in the shields. Additionally, the position of the transition between opposite polarity areas more or less defines the location at which such maximum field is obtained.

One of such patterns is in which the magnetic region 160 extends in the cross-track direction of the disc 102 at least two tracks 110, in the particular illustration, three tracks, and extends down-track at least 0.5 micrometer, in some implementations at least 1 micrometer. The magnetic region 160 of Inset B has three steps, with each step being at least 1 micrometer long in the down-track direction; thus, the magnetic region 160 has a first track region 161 with a length of at least 3 micrometers, a second track region 162 with a length of at least 2 micrometers, and a third track region 163 with a length of at least 1 micrometer.

Figure 2A:
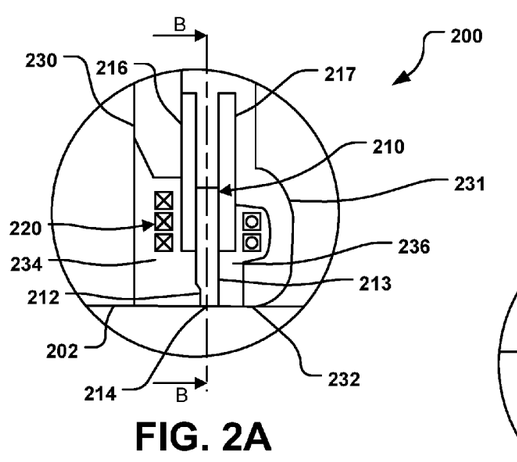
FIG. 2A is a schematic cross-sectional side view of an example write sensor in a write head.
Figure 2B:
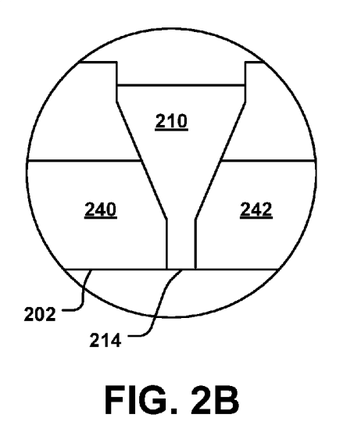
FIG. 2B is a schematic cross-sectional top view of the example write sensor, taken along the line B-B of FIG. 2A.
Figure 2C:
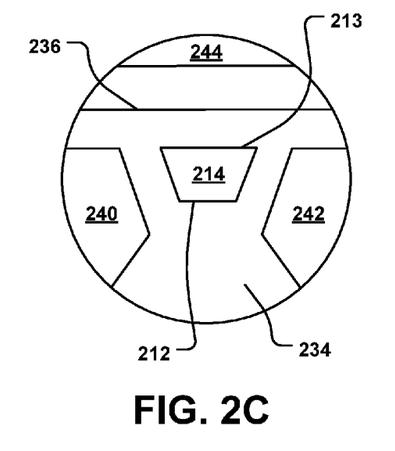
FIG. 2C is a schematic air-bearing surface (ABS) view of the example write sensor.

FIGS. 2A, 2B and 2C illustrate a more detailed view of an example write head; it should be understood that this is only one particular write head and that numerous alternate designs of write heads exist. In addition to this example write head, other implementations of write heads have shields that can be reset by the methodology described herein.

In FIG. 2A, a write head 200 has an air bearing surface (ABS) 202, a write pole or write paddle 210 having a leading edge side 212 and a trailing edge side 213. The write pole 210 has a pole tip 214 proximate the ABS 202 and a back edge (not called out) opposite pole tip 214. In this particular implementation, on the leading edge side 212 of the write pole 210 is a leading yoke 216 recessed from the pole tip 214, and on the trailing edge side 213 is a trailing yoke 217; other implementations of write heads may have only one yoke.

A coil structure 220 is present around the write pole 210 and the yokes 216, 217. The write head 200 also has a first return pole (RP1) 230 on the leading edge side 212 of the pole 210 and a second return pole (RP2) 231 on the trailing edge side 213 of pole 210. The RP2 231 includes a front shield 232 extending towards the write pole 210 at the ABS 202. Surrounding the coil structure 220, the yokes 216, 217 and the write pole 210 is electrically and magnetically insulating material 234, 236 (e.g., $Al_2O_3$).

As a result of the current flowing through the coil structure 220, a magnetic flux density is generated in the write pole 210 and a magnetic flux density is generated in the front shield 232. The direction of the current flowing in the coil structure 220 is selected such that the magnetic flux density is directed towards the ABS 202. Such magnetic flux density through the ABS 202 into the magnetic media is used for recording (writing) data on the media (e.g., the disc 102 of FIG. 1).

Another view of the write pole 210 and the pole tip 214, in relation to the ABS 202, is seen in FIG. 2B. The view of FIG. 2B is referred to as a 'top down' view of the write pole 210, where the leading side of the write pole 210 is out of the page and the trailing side of the write pole 210 is into the page. Also seen in FIG. 2B are side shields 240, 242. The side shields 240, 242 confine the magnetic flux density to the write pole 210 in the cross-track direction and improve cross-track field gradient.

The view of the pole tip 214, as seen from the ABS, is in FIG. 2C, where the side shields 240, 242 and the insulating material 234, 236 are also seen. A trailing shield 244 is also seen in FIG. 2C. In this particular implementation, the shape of the pole tip 214 is trapezoidal, with the leading side edge 212 shorter than the trailing side edge 213.

As indicated above, the pole tip 214 generates the majority of the magnetic field used when writing data to the magnetic media (e.g., disc). The shields 240, 242, 244 are typically much larger in size than the pole tip 214 and their main purpose is to facilitate efficient propagation of the magnetic flux path. Because of their large size however, maintaining a uniform magnetization in the shields 240, 242, 244 is not always possible; magnetic DWs can form in the shields 240, 242, 244, both during use of the write head 200 and when the head is switched off. These DWs can result in a highly non-uniform magnetic flux even in the magnetic media, resulting in sporadic and inconsistent data writing to the magnetic media.

Certain long range (e.g., up to about 2 micrometer away from the pole tip 214 at the ABS 202) erasure modes correlate with DW formation in the trailing shield 244 or the side shields 240, 242. The location of a DW in one of the shields 240, 242, 244 can be somewhat random and may shift during the operation of the disc drive. Additionally, a DW might be created or annihilated during the data storage assembly operation, resulting in drastic variations in erasure, so called "changer" behavior.

Provided herein are various methodologies (e.g., methods and devices) that use a stray magnetic field produced by the magnetic media (e.g., the magnetic disc) to selectively affect the magnetization in the shield material, with the purpose of aligning magnetization uniformly in the cross-track direction of the shields and thus remove or mitigate any DWs.

Figure 3A:
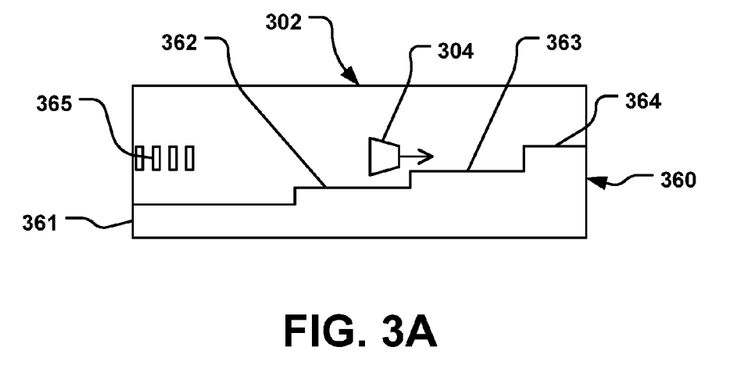
FIG. 3A is a schematic top view of storage media having a magnetic region for removing magnetic domains on the left side of the write sensor.
Figure 3B:
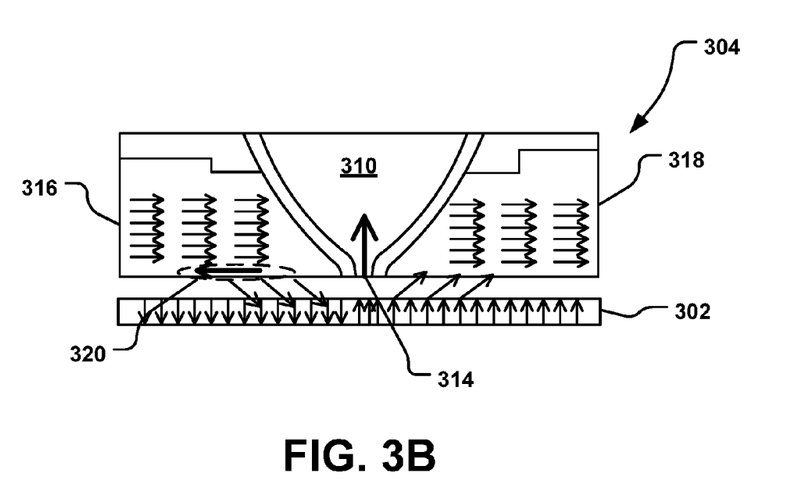
FIG. 3B is a schematic cross-sectional top view of a write head with a magnetic domain in the left side shield.
Figure 4A:
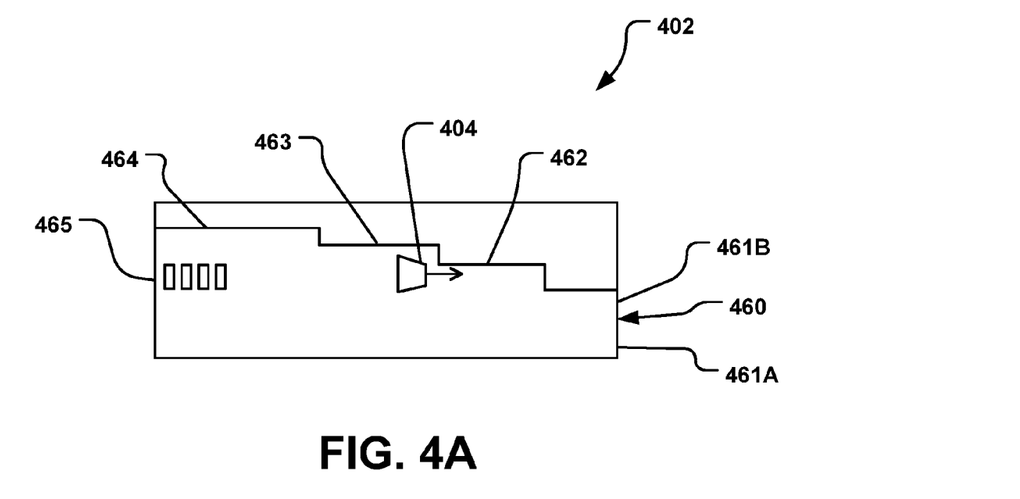
FIG. 4A is a schematic top view of storage media having a magnetic region for removing magnetic domains on the right side of the write head.
Figure 4B:
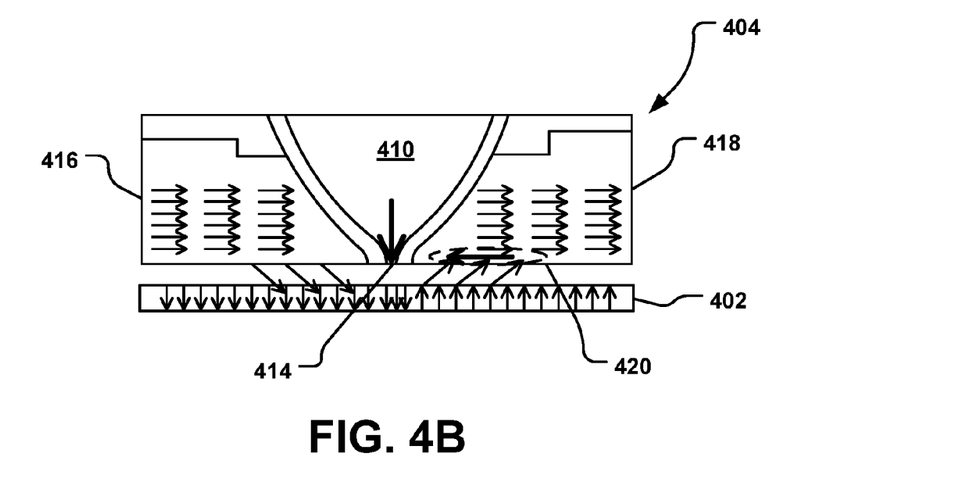
FIG. 4B is a schematic cross-sectional top view of a write head with a magnetic domain in the right side shield.

FIGS. 3A and 3B illustrate an implementation of a magnetic region on magnetic media for removing a magnetic domain wall from a left side shield of a write head (e.g., side shield 240 of FIGS. 2A, 2B, 2C), and FIGS. 4A and 4B illustrate an implementation of a magnetic region on magnetic media for removing a magnetic domain wall from a right side shield of a write head (e.g., side shield 242 of FIGS. 2A, 2B, 2C). The various features of one implementation are suitable for the other implementation, unless indicated otherwise. It is noted, however, that regions of opposite polarity are used to reset a left side shield (e.g., side shield 240) and a right side shield (e.g., side shield 242).

In FIG. 3A, a top view of a portion of a magnetic media 302 (e.g., a magnetic disc) is illustrated; also illustrated is a write head 304 (particularly the write pole tip) positioned flying above the media 302. The media 302 includes a magnetic region 360, in this implementation having four steps extending cross-track across the media 302; each step occupies one cross-track width. In particular, the magnetic region 360 has tracks that converge towards the location of the pole tip, which corresponds to the magnetic field created by the written pattern originating far away from the pole tip and gradually converging towards it, with the expected result of "pushing" the DW towards the pole tip region, which is likely to result in its annihilation. As a possible implementation, one can consider the pattern with the first track region 361 that extends at least 4 micrometers, a second track region 362 that extends at least 3 micrometers, a third track region 363 that extends at least 2 micrometers, and a fourth track region 364 that extends at least 1 micrometer in the down-track direction. As it flies over the media 302, the write head 304 passes over one of the track regions 361, 362, 363, 364 depending on the location of the domain wall (DW) in the write head left side shield; multiple passes (e.g., by way of multiple spins of a disc) may be made over the desired region. The magnetic region 360 has a unidirectional magnetic field sufficiently large (e.g., at least about 1000 Oe, in some implementations about 1500 Oe) to modify the magnetic IAN' in the write head left side shield. The magnetic region 360, in this implementation, also includes a registration mark 365, which has a magnetic field comparable to that of the region 360.

In FIG. 3B, a top view of the write head 304 is shown, particularly showing a write pole 310 and write pole tip 314, in close proximity to the media 302. On either side of the write pole 310 is a side shield, identified as a left side shield 316 and a right side shield 318; the desired magnetization of both side shields 316, 318 is illustrated in the shields 316, 318. Present in the left side shield 316 is a magnetic domain wall (DW) 320, which is a disturbance in the magnetization of the shield 316; in this particular implementation, the magnetization direction of the DW 320 is antiparallel to the desired magnetization of the shield 316, although in other implementations the DW magnetization direction may be at a different angle to the desired magnetization of the shield 316.

To mitigate (e.g., remove) the DW 320 from the side shield 316 (e.g., to return the magnetization orientation back to the desired orientation), the write head 304 is passed in close proximity to (e.g., flown over) the magnetic region 360 of the media 302, as shown in FIG. 3A.

In FIG. 3B the write head 304 is shown operably engaged with (e.g., flying over) the media 302. The write head 304 is positioned over the media 302 so that the portion of the head 304 having the DW 320, which in this particular implementation is the left side shield 316, is positioned over the magnetic region 360. Shown on the media 302 are magnetization directions, either up toward the write head 304 or down away from the write head 304; the media shown to the left of the write pole 310 is the magnetic region 360 (and thus has a magnetization direction down), whereas the media to the right of the write pole 310 is not within the magnetic region 360, thus has an up magnetization direction.

The write head 304 passes over one of the track regions 361, 362, 363, 364 of the magnetic region 360 (shown in FIG. 3A) depending on the location of the DW 320 in relation to the write pole tip 314. As the write head 304 moves over the media 302 and the magnetic region 360 (which movement will be out of the page) the magnetization in the magnetic region 360 urges the magnetization orientation of the DW 320 to rotate counterclockwise and align with the magnetic region 360 (downward, in this implementation), from which the magnetic orientation of the write pole tip 314 completes the rotation so that the magnetization direction of the former DW is now with the remainder of the side shield 316. When it is not desired to affect any portion of the shield with the magnetic region 360, the write head 304 can be turned "off" as it passes over the magnetic region 360.

Similarly, in FIG. 4A, a top view of a portion of a magnetic media 402 (e.g., a magnetic disc) is illustrated with a write head 404 (particularly the write pole tip) positioned flying above the media 402. The media 402 includes a magnetic region 460, in this implementation, having four steps extending across five tracks across the media 402. In particularly, the magnetic region 460 has a first track region 461A that occupies a first track and that extends at least 4 micrometers, a second track region 461B that occupies another track and that extends at least 4 micrometers, a third track region 462 that extends at least 3 micrometers, a fourth track region 463 that extends at least 2 micrometers, and a fifth track region 464 that extends at least 1 micrometer in the down-track direction. As it flies over the media 402, the write head 404 passes over one of the track regions 461A, 461B, 462, 463, 464 depending on the location of the domain wall (DW) in the write head right side shield. The magnetic region 460 has a unidirectional magnetic field sufficiently large to modify the magnetic DW in the write head right side shield; the direction (polarity) of the magnetic field for the region 460 is opposite to that of the magnetic field for the region 360 (of FIG. 3), where the DW being removed is in the left side shield. The magnetic region 460, in this implementation, also includes a registration mark 465, which in this implementation has a low or no magnetic field.

In FIG. 4B, a top view of the write head 404 is shown, particularly showing a write pole 410 and pole tip 414, in close proximity to the media 402. On either side of the write pole 410 is a side shield, identified as a left side shield 416 and a right side shield 418; the desired magnetization of both side shields 416, 418 is illustrated in the shields 416, 418. Present in the right side shield 418 is a magnetic domain wall (DW) 420.

To mitigate (e.g., remove) the DW 420 from the side shield 418 and return the magnetization orientation back to the desired orientation, the write head 404 is passed in close proximity to (e.g., flown over) the magnetic region 460 of the media 402.

In FIG. 4B the write head 404 is shown operably engaged with (e.g., flying over) the media 402. The write head 404 is positioned over the media 402 so that the portion of the head 404 having the DW 420, which in this particular implementation is the right side shield 418, is positioned over the magnetic region 460. Shown on the media 402 are magnetization directions, either up toward the write head 404 or down away from the write head 404; the media shown to the left of the write pole 410 is the magnetic region 460 (and thus has a magnetization direction down), whereas the media to the right of the write pole 410 is not within the magnetic region 460, thus has an up magnetization direction.

The write head 404 passes over one of the track regions 461A, 461B, 462, 463, 464 of the magnetic region 460 (shown in FIG. 4A) depending on the location of the DW 420 in relation to the write pole tip 414. As the write head 404 moves over the media 402 and the magnetic region 460 (which movement will be out of the page) the magnetization in the magnetic region 460 urges the magnetization orientation of the DW 420 to rotate counterclockwise and align with the magnetic region 460 (downward, in this implementation), from which the magnetic orientation of the write pole tip 414 completes the rotation so that the magnetization direction of the former DW is now with the remainder of the side shield 418.

The resetting of the shield(s) may be done as the data storage assembly is operating (e.g., reading or writing data) or with the assembly in a 'maintenance mode.' In such a maintenance mode, which may be between read/write operations or e.g., scheduled during known down times, such as the middle of the night, the assembly can perform self-diagnostics to determine the presence of any magnetic domain wall and then initiate a reset process.

Figure 5:
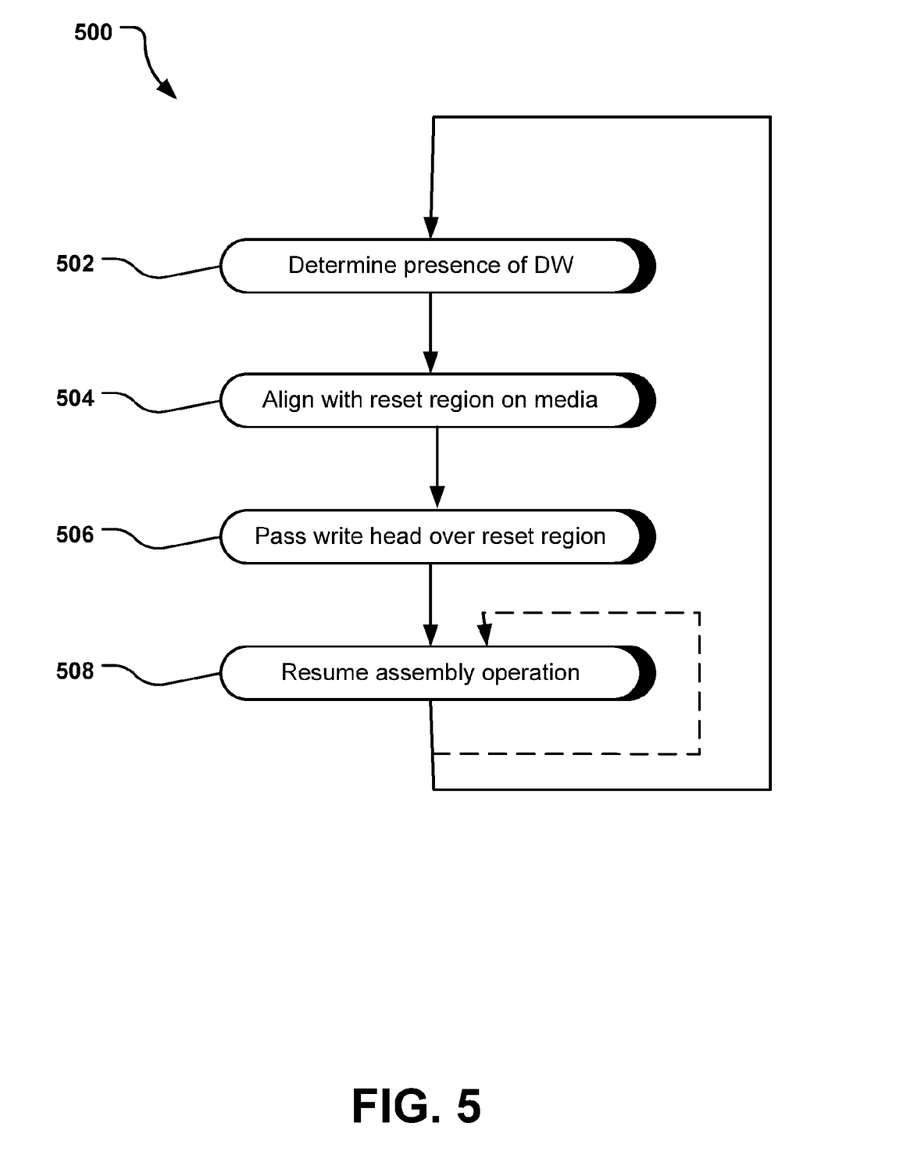
FIG. 5 is a step-wise flow chart of an example method for removing a domain wall from a read/write head.

An example reset process 500 for a write head is illustrated step-wise in FIG. 5; the writer or write head is present on a slider incorporated into a data storage assembly. In step 502, the presence and/or location of a DW is determined, e.g. by the writer; the DW may be, e.g., in a trailing shield, left side shield or right side shield. Step 502 may be done while the data storage assembly is operating (reading or writing data) or with the assembly in a 'maintenance mode.' In step 504, the writer is aligned with a reset region on the magnetic media of the data storage assembly. This region has a high unidirectional magnetic field (e.g., at least 1000 Oe). In step 506, the write head is passed over the magnetic region, wherein the magnetic field rotates the magnetization of the DW. Step 506 may be repeated as needed to confirm the DW has been reset. After the DW has been reset, in step 508 the data storage assembly resumes operation, after which the process 500 can be initiated again, periodically.

Various implementations of resetting a DW in a writer shield, by using a magnetic region having a magnetization pattern on the media, have been described above. With such a magnetization direction pattern on the media, the magnetization in shields can be reset, improving writer performance, e.g., reduction of inadvertent or undesired erasure.

The magnetization pattern on the media can be selected (e.g., optimized) to produce the maximum field in the location (e.g., distance from the write pole tip) where the shield magnetization needs to be reset, while at the same time limiting the fields produced by the media in undesirable direction (for example, opposite to the direction in which the writer was originally set). This can be accomplished by, e.g.: adjusting the width of the track (modeling has suggested that the field amplitude saturates when the tracks are 100-180 nm wide); adjusting the write head location with respect to the track's center (modeling suggests having the head, particularly the write pole tip at the track's edge is better); adjusting the track's polarity to impact the specific side of the shield (left or right); adjusting the track's width so as to not impact the shield without the DW, by moving the track edge far away from the pole tip; adjusting the track length (having a magnetization region length of, e.g., at least 1 micrometer, at least 2 micrometers, at least 5 micrometers, etc.). The number of revolutions during which the write head dwells on a track in the magnetization region can be modified for optimal switching speed and/or efficiency.

As indicated above, separate regions (or at least separate tracks) having opposite polarity are used for resetting left side shield versus a right side shield. These two cases are separate and result in general in different probability of properly resetting the shields. A writer can be turned on or off while flying over such "resetting" tracks, thus insuring that properly aligned magnetization is not disturbed.

The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of removing a magnetic domain from a slider structure in a storage assembly having a storage media, the method comprising:

passing the slider structure in close proximity to a region on the storage media having a magnetic field sufficiently large to switch a magnetization direction of the magnetic domain and thus remove the magnetic domain from the slider structure.

2. The method of claim 1, wherein the storage media is a disc and the region extends across at least two tracks of the disc and is at least as long as a sector.

3. The method of claim 1, wherein the region is at least 100 nm wide and 1000 nm (1 micrometer) long.

4. The method of claim 3, wherein the region is 100-180 nm wide and at least 2000 nm (2 micrometers) long.

5. The method of claim 1, wherein the region has a magnetic field of at least 1000 Oe.

6. The method of claim 1, wherein the slider structure comprises a read head and a write head, and the read head and write head are turned off as the slider structure passes in close proximity to the region.

7. A method of mitigating a magnetic domain from a shield in a write head having a write pole tip, the method comprising:

passing the write head in close proximity to a region on a storage media having a magnetic field sufficiently large to converge toward the pole tip and mitigate the magnetic domain.

8. The method of claim 7, wherein the magnetic field is sufficiently large to switch a magnetization direction of the magnetic domain.

9. The method of claim 7, wherein the storage media is a disc and the region extends across more than two tracks.

10. The method of claim 7, wherein the region is at least 100 nm wide and 1000 nm (1 micrometer) long.

11. The method of claim 10, wherein the region is 100-180 nm wide and at least 2000 nm (2 micrometers) long.

12. The method of claim 7, wherein the region has a magnetic field of at least 1000 Oe.

13. The method of claim 7, wherein the write head is turned off as the write head passes in close proximity to the region.

14. A magnetic media comprising:

a plurality of tracks each having a plurality of data bits; and a reset region extending cross-track across at least two tracks of the plurality of tracks and extending down-track at least 1 micrometer, the reset region having a unidirectional magnetization.

15. The media of claim 14, wherein the reset region has a magnetic field of at least 1000 Oe.

16. The media of claim 14, wherein the reset region has a stepped profile cross-track across the at least two tracks.

17. The media of claim 14, wherein the reset region has a first step on a first track at least 1000 nm (1 micrometer) long and a second step on an adjacent second track at least 2000 nm (2 micrometers) long.

18. The media of claim 17, further comprising a third step on an adjacent third track at least 3000 nm (3 micrometers) long.

19. The media of claim 14, further comprising a second reset region having a unidirectional magnetization in a direction opposite to the first unidirectional magnetization.

* * * * *